United States Patent
Heim et al.

(10) Patent No.: US 8,951,461 B2
(45) Date of Patent: Feb. 10, 2015

(54) METHOD FOR PRODUCING A PLASTIC ARTICLE AND BLOW MOLDING TOOL

(75) Inventors: Volker Heim, Alfter (DE); Andreas Lichtenauer, Bonn (DE); Jurgen Moitzheim, Konigswinter (DE); Stefan Walbroel, Sankt Augustin (DE)

(73) Assignee: Kautex Maschinenbau GmbH, Bonn (DE)

( * ) Notice: Subject to any disclaimer, the term of this patent is extended or adjusted under 35 U.S.C. 154(b) by 519 days.

(21) Appl. No.: 13/380,772

(22) PCT Filed: Jun. 22, 2010

(86) PCT No.: PCT/EP2010/003752
§ 371 (c)(1),
(2), (4) Date: Mar. 19, 2012

(87) PCT Pub. No.: WO2010/149336
PCT Pub. Date: Dec. 29, 2010

(65) Prior Publication Data
US 2012/0161373 A1 Jun. 28, 2012

(30) Foreign Application Priority Data
Jun. 24, 2009 (DE) .......................... 10 2009 030 492

(51) Int. Cl.
*B29C 49/18* (2006.01)
*B29C 49/20* (2006.01)
(Continued)

(52) U.S. Cl.
CPC .................. *B29C 49/18* (2013.01); *B29C 49/20* (2013.01); *B29C 49/4802* (2013.01);
(Continued)

(58) Field of Classification Search
CPC ......................... B29C 49/18; B29C 2049/2008
USPC .................................. 264/516, 540; 425/530
See application file for complete search history.

(56) References Cited

U.S. PATENT DOCUMENTS 3,142,089 A * 7/1964 Wilkalis et al. ............... 425/301
3,300,556 A 1/1967 Battenfeld et al.
(Continued)

FOREIGN PATENT DOCUMENTS

DE 1801966 6/1970
DE 2933212 2/1981
(Continued)

OTHER PUBLICATIONS

PCT Search Report dated Jan. 3, 2011, received in related PCT Application No. PCT/EP2010/003830.
(Continued)

*Primary Examiner* — Matthew Daniels
(74) *Attorney, Agent, or Firm* — Grossman Tucker Perreault & Pfleger, PLLC

(57) ABSTRACT

The invention relates to a method for producing a plastic article and a blow molding tool for performing the method. The method comprises extruding an approximately tube-shaped preform, dividing the melt flow within the extrusion head or separating the extrudate exiting or already exited from the extrusion head, such that a preform having an approximately C-shaped cross section is obtained, forming the preform into a hollow part within a multipart blow molding tool using differential pressure, wherein an expansion and partial preforming of the preform first takes place with the blow molding tool partially closed, then in a further step at least one insert is inserted into the interior of the partially preformed article between the not completely closed blow molding tool and through the open side of the preform, and in a further step the blow molding tool is completely closed; wherein the article is completely formed, forming at least one at least partially circumferential pinch-off seam.

9 Claims, 9 Drawing Sheets

Figure 1:
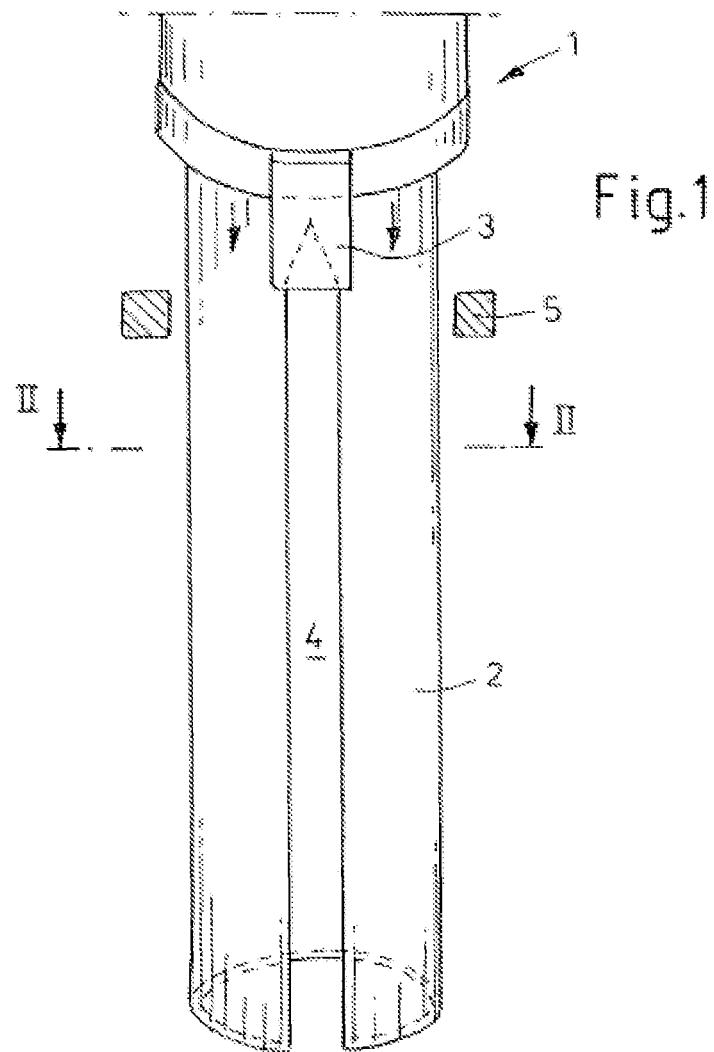

(51) Int. Cl.
    *B29C 49/48* (2006.01)
    *B29C 47/00* (2006.01)
    *B29C 49/04* (2006.01)
    *B29C 49/42* (2006.01)
    *B29C 49/58* (2006.01)
    *B29C 49/62* (2006.01)
    *B29L 31/00* (2006.01)

(52) U.S. Cl.
    CPC ........ B29C 49/4817 (2013.01); *B29C 47/0023* (2013.01); *B29C 47/0026* (2013.01); *B29C 47/0054* (2013.01); *B29C 47/0066* (2013.01); *B29C 49/04* (2013.01); *B29C 49/4242* (2013.01); *B29C 49/58* (2013.01); *B29C 2049/2008* (2013.01); *B29C 2049/2073* (2013.01); *B29C 2049/4807* (2013.01); *B29C 2049/4851* (2013.01); *B29C 2049/622* (2013.01); *B29C 2793/0063* (2013.01); *B29C 2793/0081* (2013.01); *B29L 2031/7172* (2013.01)
    USPC ............................ 264/516; 264/540; 425/530

(56) References Cited

U.S. PATENT DOCUMENTS

| | | | |
|---|---|---|---|
| 3,954,369 A | | 5/1976 | Kormendi |
| 4,719,072 A | * | 1/1988 | Kojima et al. ................ 264/515 |
| 4,952,347 A | * | 8/1990 | Kasugai ........................ 264/457 |
| 5,326,514 A | * | 7/1994 | Linden et al. .................. 264/83 |
| 5,514,323 A | * | 5/1996 | Ramioulle .................... 264/516 |
| 5,750,067 A | * | 5/1998 | Hellbrugge .................... 264/515 |
| 6,866,812 B2 | | 3/2005 | Van Schaftingen et al. |
| 6,978,802 B2 | | 12/2005 | Hagano et al. |
| 2002/0105115 A1 | * | 8/2002 | Sadr .............................. 264/510 |
| 2009/0250846 A1 | | 10/2009 | Criel et al. |
| 2010/0126659 A1 | | 5/2010 | Roos et al. |

FOREIGN PATENT DOCUMENTS

| | | |
|---|---|---|
| DE | 8225986 | 6/1985 |
| DE | 19600872 | 7/1997 |
| EP | 0103832 | 3/1984 |
| JP | 55007405 | 1/1980 |
| JP | 56051333 | 5/1981 |
| JP | 61110529 | 5/1986 |
| JP | 11254511 | 9/1999 |
| JP | 2006015744 | 1/2006 |

OTHER PUBLICATIONS

PCT English Translation of the International Preliminary Report on Patentability mailed Jan. 26, 2012, received in related PCT Application No. PCT/EP2010/003830.
XP002612713, Database WPI, Thomson Scientific, London, 1999, 2 pgs.
PCT Search Report dated Jul. 5, 2011, received in corresponding PCT Application No. PCT/EP2010/003752.
PCT Written Opinion dated Jul. 5, 2011, received in corresponding PCT Application No. PCT/EP2010/003752.
PCT English Translation of the International Preliminary Report on Patentability mailed Jan. 26, 2012, received in corresponding PCT Application No. PCT/EP2010/003752.
English translation of Japanese Office Action mailed Mar. 11, 2014, received in related Japanese Patent Application No. 2012-516577, 3 pgs.
English translation of Japanese Office Action mailed Mar. 11, 2014, received in related Japanese Patent Application No. 2012-516564, 2 pgs.
US Office Action mailed May 21, 2014, received in related U.S. Appl. No. 13/382,053, 11 pgs.

* cited by examiner

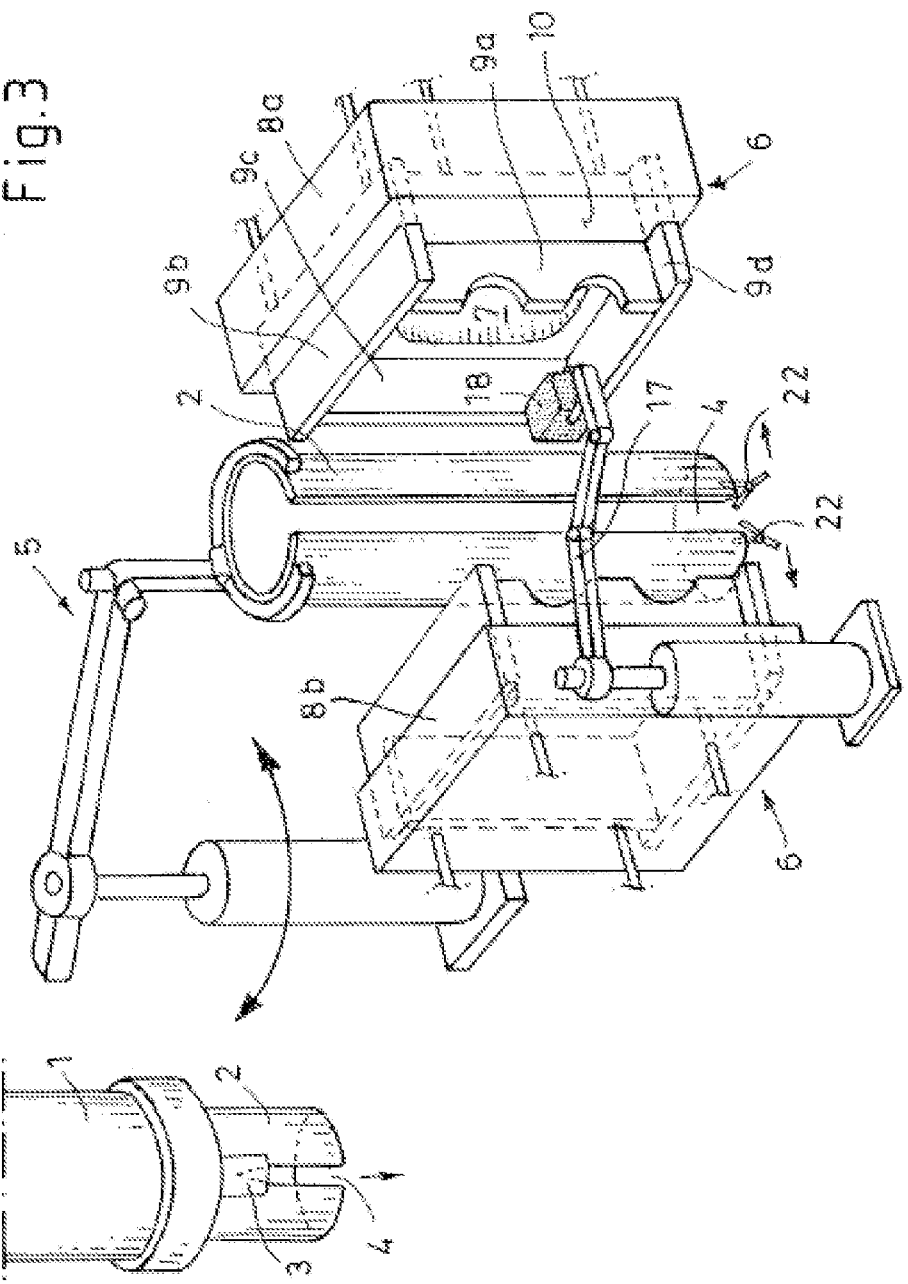

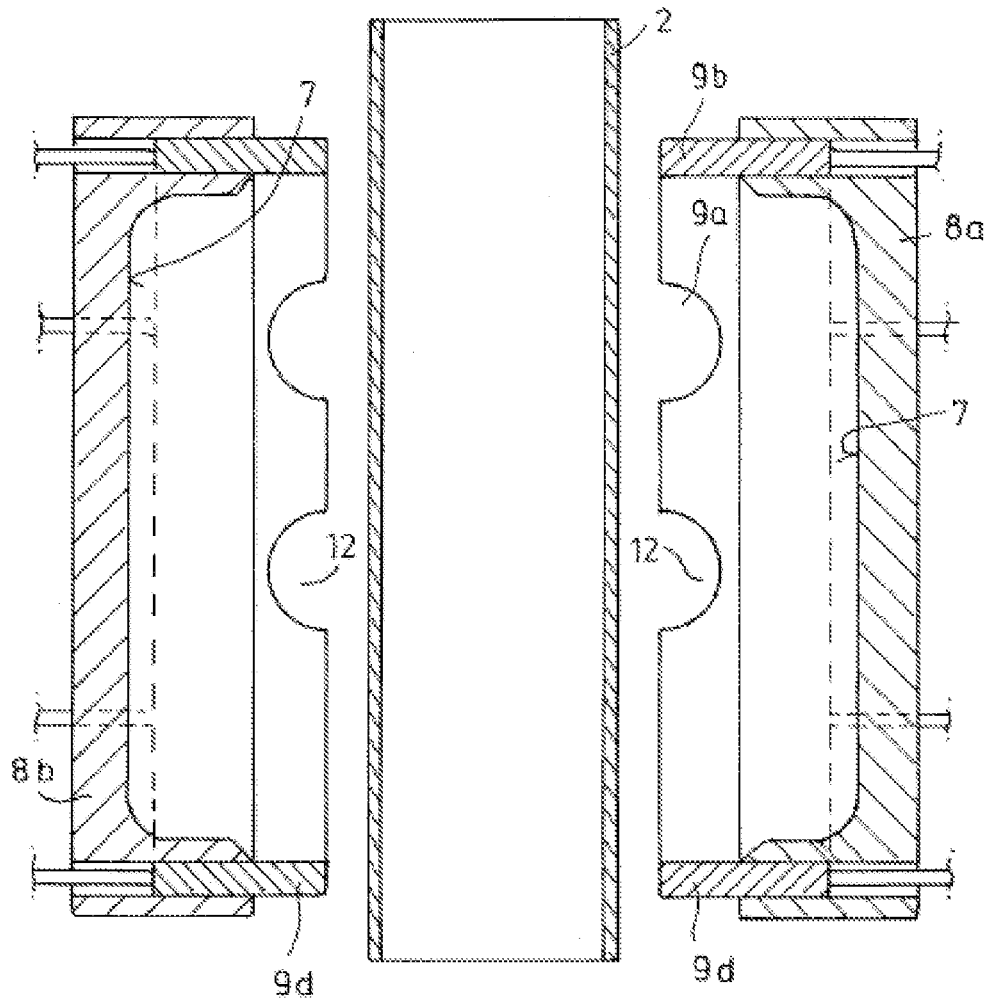

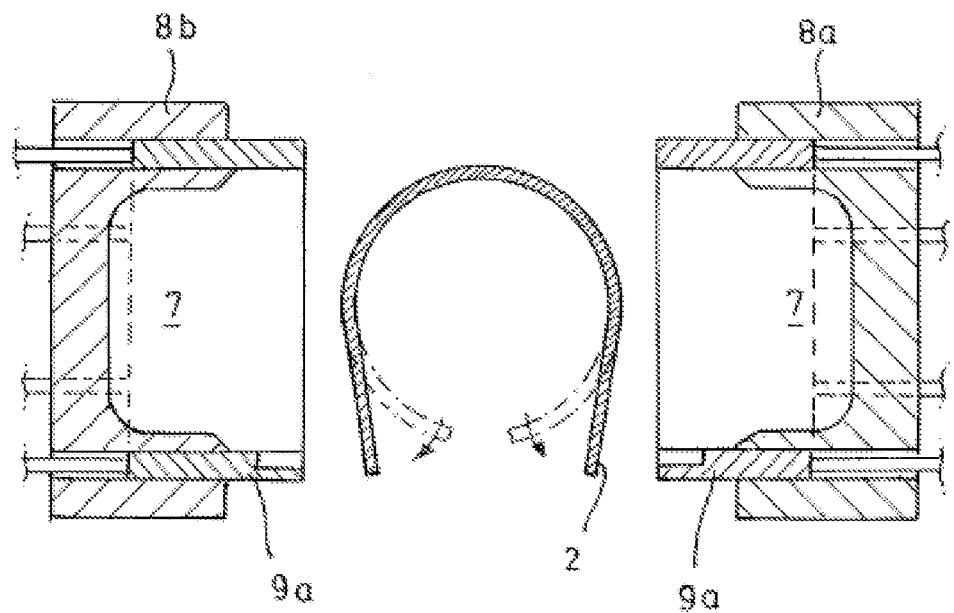

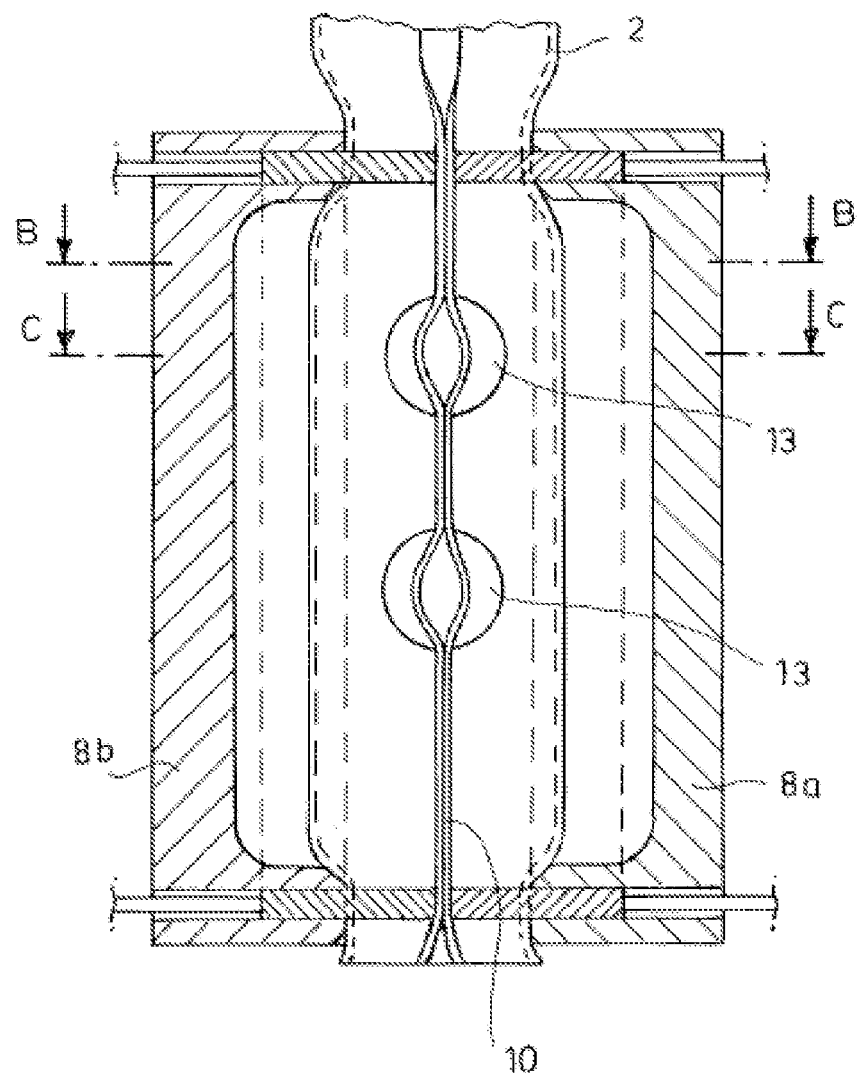

METHOD FOR PRODUCING A PLASTIC ARTICLE AND BLOW MOLDING TOOL

In particular when producing large plastic tanks by extrusion blow molding, it is often desirable to introduce inserts into the tank that is to be completed. For example, motor vehicle fuel tanks made of thermoplastic material are often provided with functional internals or inserts which are either manually introduced after production of the tank, through one or more inspection openings provided in it, or are encapsulated by extrusion blow molding during the forming of the tank. For this purpose, it is known to place the inserts that are to be introduced into the tank on a mandrel/carrier and arrange them between the opened halves of a blow molding tool in such a way that the preform tube of thermoplastic material extruded by means of the blow molding tool is extruded over the carrier and the components arranged on it. In this case, the tube is slipped over the functional component carrier and the functional components. Then, the mold halves of the blow molding tool close around the carrier and the functional components arranged on it. The functional component carrier can thereby be fused with the wall of the later tank. In a further operation, the tube-shaped preform is expanded within the blow molding tool. Such a method is known, for example, from DE 602 18 237 T2. The known encapsulation of inserts on the ship-in-a-bottle principle is also used, inter alia, when the inserts that are to be introduced into the tank are larger than the inspection openings to be provided in it.

In particular in the case of fuel tanks made of thermoplastic material, it is problematic that the plastics used for them, generally HDPE, are not diffusion-resistant to hydrocarbons. For this reason, modern fuel tanks made of thermoplastic material are produced from co-extrudates with barrier layers for hydrocarbons. In this way it is possible to ensure the leak-tightness of the fuel tank system to the greatest extent, even though the barrier layer is damaged/interrupted by openings in the tank wall that are to be subsequently provided, so that locations where volatile hydrocarbons can potentially leak out are created in the region of circular cutouts and/or inspection openings in the tank wall.

Therefore, recently every effort has been directed at introducing all the inserts, as far as possible, into the fuel tank already during its production, in order to keep the number of required openings in the tank wall as low as possible.

The so-called encapsulation of inserts by blow molding does address this problem with regard to the size of the required openings in the tank wall, but under some circumstances the attachment of some inserts, such as for example valves or the like, requires the tank wall to be damaged in the sense of a puncture or penetration, so that as a result the number of openings required is not significantly reduced.

Therefore, EP 1 110 697 B1 proposes a method in which the extrudate emerging from the extruder head with a closed cross section is separated on two diametrically opposed sides so as to obtain two preforms in sheet form, which are guided with the aid of a guiding direction and, before their shaping, are kept at a distance from each other while an accessory that is intended to be incorporated in the later tank is introduced between the two.

This method is relatively favorable, in particular with regard to the space available for handling the inserts, but requires complex equipment for guiding the still warm and plastic extrudates in sheet form. In addition, the use of this method is restricted to a spatially fixed arrangement of the extruder head in relation to the blow molding tool.

A method for producing a plastic article according to the preamble of claim 1 is known from JP 56 0511333 A. A similar method is known, for example, from JP 11 254511 A.

The invention is therefore based on the object of providing a method according to the preamble of claim 1 which makes it possible for inserts to be introduced into the plastic article without more complex equipment and is not restricted to a spatially fixed arrangement of the extruder head in relation to the blow moulding tool.

The object is achieved by the features of claim 1, advantageous refinements of the method according to the invention being provided by the subclaims.

For the purposes of the invention, a blow molding tool should be understood as meaning a tool which has at least two blow mold halves each with a cavity, which in the completely closed state form an impression for an article to be formed. The blow mold halves may be respectively arranged on platens and be of a one-part or multi-part form. In a known way, they may have slides for demolding undercuts or the like. Within the scope of the invention, the blow molding tool may also have more than two tool parts, which can be moved in relation to one another, the term "blow mold halves" being used hereafter for the sake of simplicity.

The method according to the invention has the advantage in particular that virtually complete (partial) forming of the preform already takes place in a first step, with the blow molding tool not completely closed. The fact that the tube is open (slit) on one side means that one or more inserts can be introduced by means of a manipulator between the not completely closed blow mold halves into the interior of the tank to be produced and attached there, for example by fusing with the still warm and plastic tank wall.

The method according to the invention provides the initial and subsequent forming of the extrudate in the first heat, i.e. without further heating, while not ruling out the possibility of partially heating the insert that is to be introduced and/or the tank wall in the region where the insert is fused with the tank wall to improve the fused connection.

With the slides/mold spacers of the blow molding tool, the preform is initially clamped between these mold spacers, while forming a pre-chamber. The preform is then placed against the cavities of the blow molding tool, the shape thereof at this stage of the method not yet corresponding to the final shape of the article.

In the case of an expedient refinement of the method according to the invention, it is provided that the closing movement of the blow molding tool takes place in two stages, wherein, in a first stage of the closing movement, at least one retractable and extendable slide, preferably two such slides respectively framing the cavities of the blow molding tool as mold spacers, clamp the preform between them, while forming at least one opening.

Expediently, an expansion of the preform into the blow mold halves and the introduction of the insert take place between the first and second stages of the closing movement.

Although reference is made hereafter to one insert, the invention should be understood as meaning that it is of course possible for a number of inserts to be introduced into the article.

Other manipulations within the article to be produced can also be performed through the lateral opening of the preform tube and through the opening between the blow mold halves.

The method according to the invention may relate to the production of a fuel tank, but the invention should be understood as meaning that any hollow plastic body can be produced by the method according to the invention.

In the case of a variant of the method, it is provided that the preform is expanded by means of blowing air, at least one blowing pin being introduced into the opening formed by the mold spacers.

Instead of an opening, it is also possible to provide a number of openings, which may also respectively be provided for receiving a blowing pin.

Expediently, the introduction of the insert takes place through the opening formed by the mold spacers.

In the case of a preferred variant of the method according to the invention, the preform is taken off from the extruder head and brought between the opened halves of the blow molding tool by means of a gripper.

In this case, the preform may be expanded or partially stretched in the circumferential direction, for example before or during the introduction between the opened blow mold halves. Grippers intended for this purpose are described, for example, in DE 102 05 524 of the applicant's legal predecessor, to the full content of which reference is made here, including for the purpose of disclosure. It may expediently be envisaged to secure the preform at ends that are respectively remote from one another and expand or stretch it in the circumferential direction.

The expansion of the preform takes place only to the extent that is required to produce an overlap of the preform tube with the mold spacers and/or the pinch-off edges of the blow molding tool.

It is particularly expedient if the insert is introduced into the partially formed preform by means of a preferably multiaxis manipulator.

In the case of an expedient variant of the method according to the invention, it is provided that, after the introduction of the insert or the inserts into the partially formed preform, a blowing pin is once again introduced into the opening formed by the mold spacers and the preform is once again subjected to blowing air, in order to remove any folds occurring, in particular in the region between the pinch-off edges of the blow molding tool and the mold spacers.

After that, the blow molding tools can be closed together and the blow molding of the plastic article can be completed.

The object on which the invention is based is also achieved by a blow molding tool for producing a plastic article, in particular for carrying out the method described above, wherein the blow molding tool comprises at least two blow mold halves forming an impression, which perform an opening and closing movement in relation to one another, wherein at least one blow mold half, preferably both, is/are provided with at least one slide framing the respective cavity as a mold spacer, which is provided with at least one recess to form an opening for receiving a blowing pin and/or for leading through a manipulator.

In the case of an expedient refinement of the blow molding tool according to the invention, it is provided that it comprises at least one blowing pin, which has a surrounding sealing collar, which during the expansion of the preform can be brought into sealing contact with the mold spacers moved into abutment.

Expediently, the mold spacers are formed such that they can be retracted into and extended out of the separating plane of the blow mold halves, for example hydraulically.

To avoid excessive flash, it is advisable if the mold spacers are adapted to the contour of the cavities. In this case, the mold spacers do not necessarily have to respectively consist of a single slide segment; rather, they may also consist of a multiplicity of slide segments arranged next to one another in the separating plane of the blow mold halves.

It is preferred for at least one mold spacer to be formed such that its temperature can be controlled, in particular such that it can be heated, in order that the material of the preforms within the frame formed by the mold spacers remains plastic.

In the case of a further expedient refinement of the blow molding tool according to the invention, it may be provided that at least one mold spacer is provided with suction openings that can be subjected to negative pressure for fixing the preform. The preform can be held in this region against the mold spacers by means of a vacuum applied to the mold spacers. Expediently, suction openings or vacuum bores are provided at a distance from one another over the entire periphery of the mold spacers, on the inner side thereof that is facing the cavity.

Figure 2:
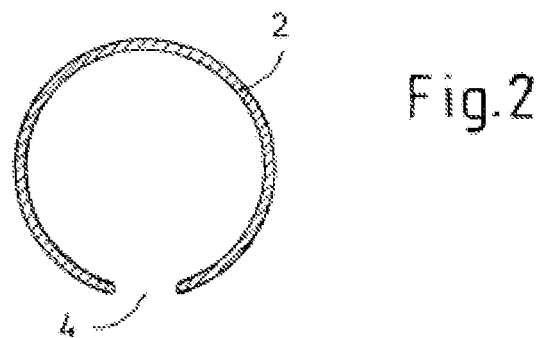
Figure 5B:
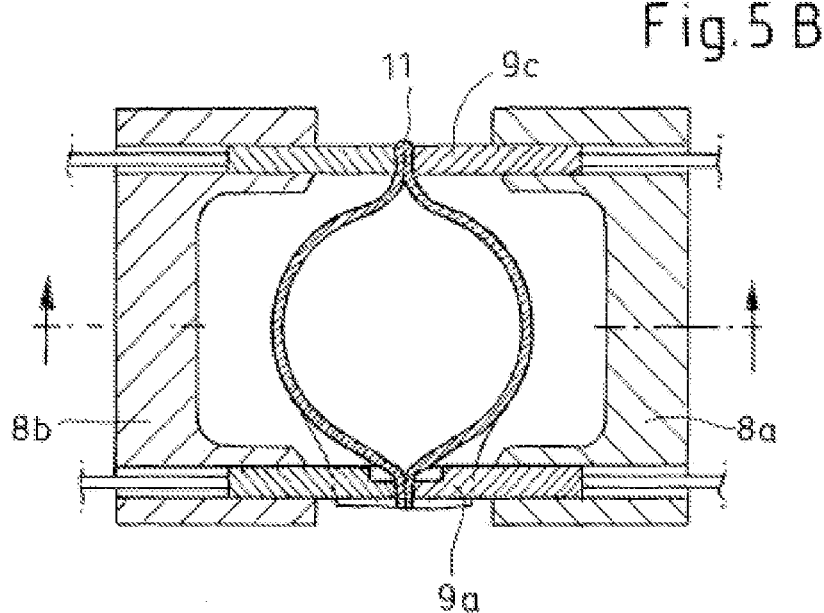
Figure 5C:
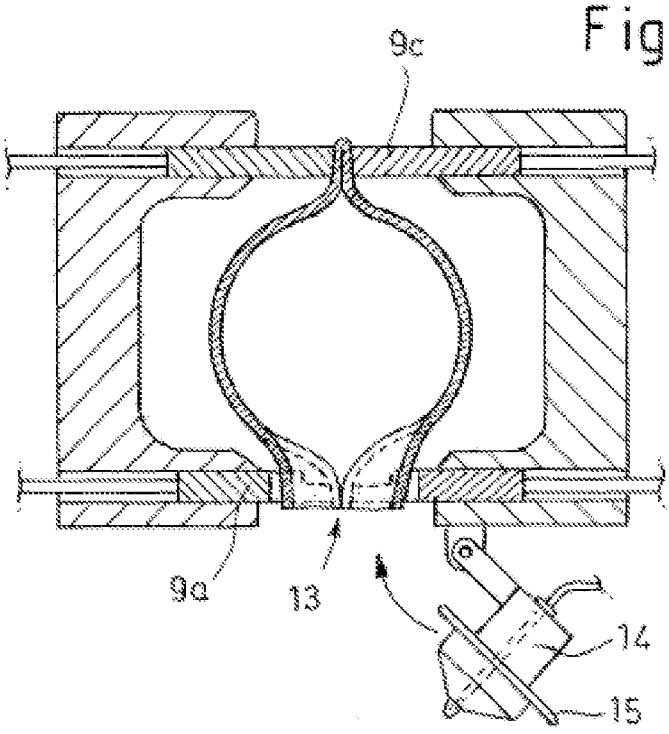
Figure 5D:
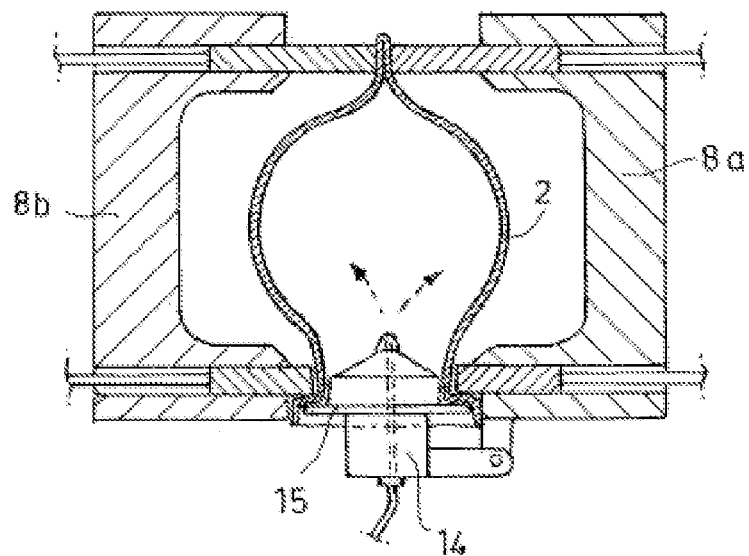
Figure 5E:
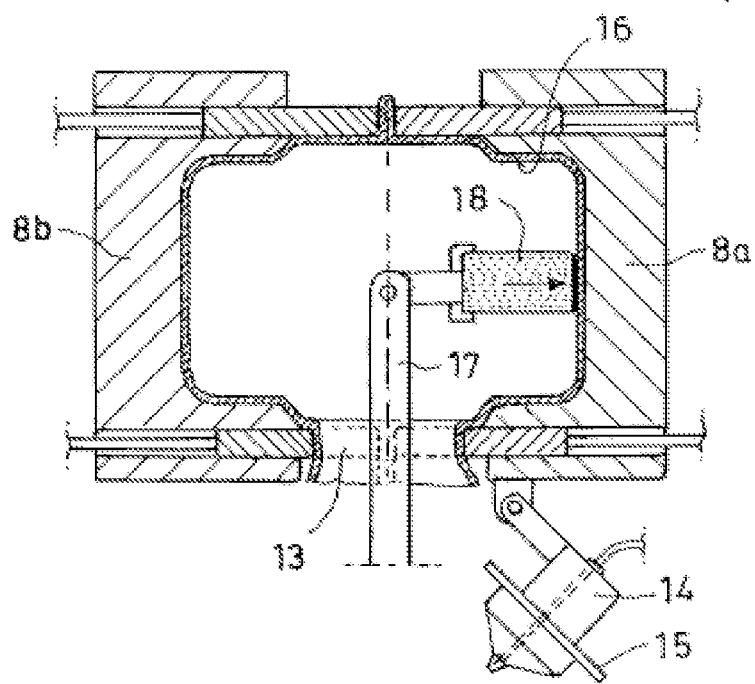
Figure 6A:
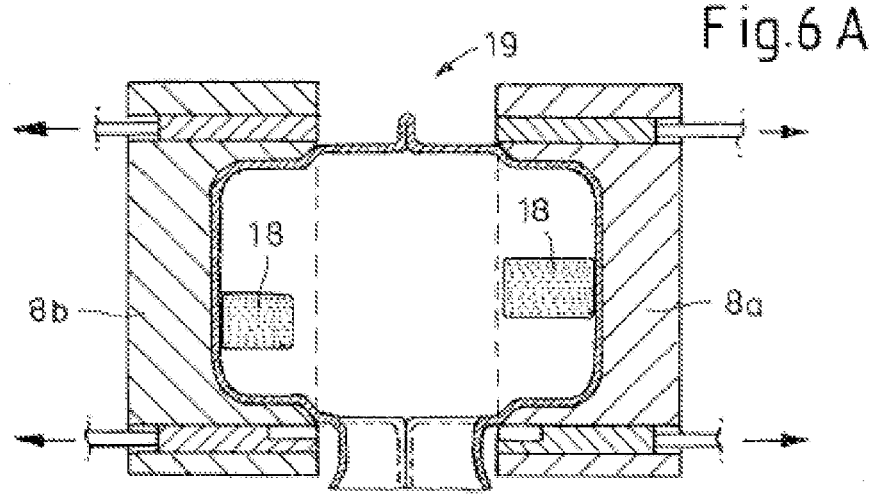
Figure 6B:
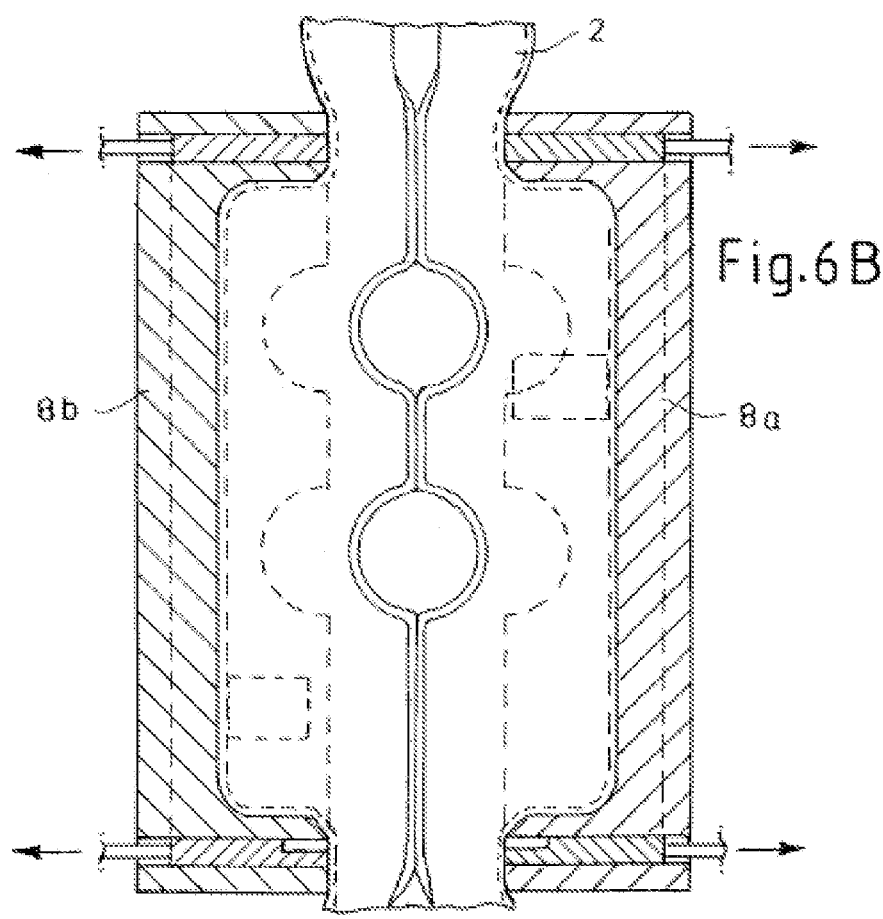
Figure 7A:
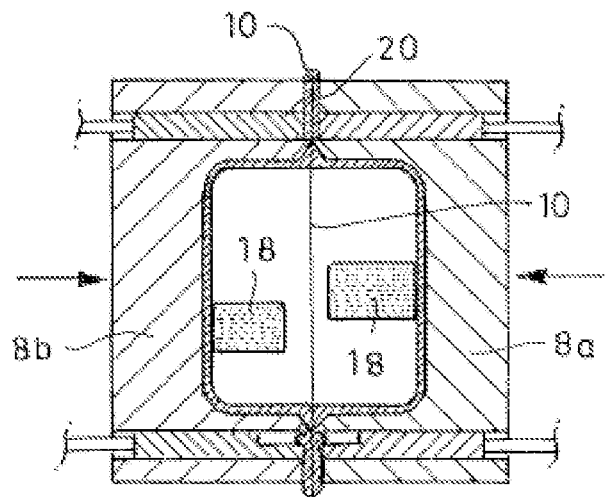
Figure 7B:
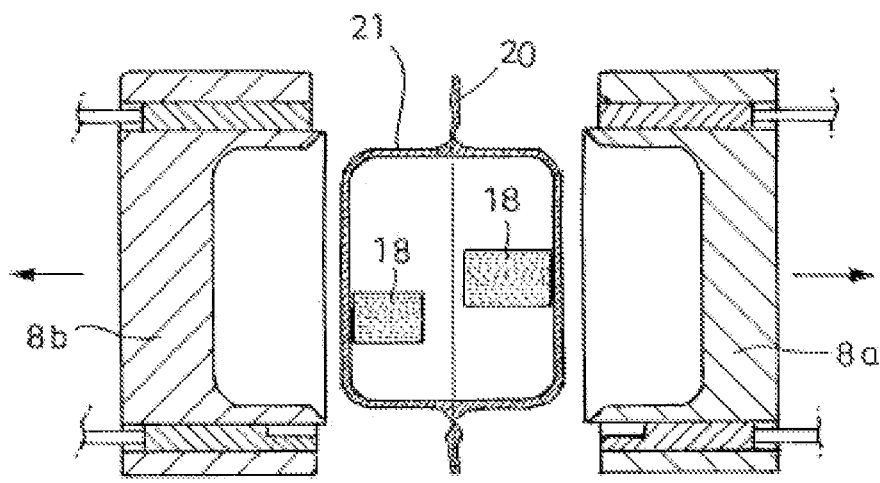

The invention is explained below on the basis of an exemplary embodiment that is represented in the drawings, in which:

FIG. 1 shows a perspective view of part of an extruder head with the preform emerging from it, FIG. 2 shows a sectional view along the lines II-II in FIG. 1, FIG. 3 shows a perspective view of a device for blow molding plastic articles according to the invention, which also illustrates the sequence of the method according to the invention, FIG. 4a shows a sectional view through the blow molding tool in FIG. 3 and the preform placed between the blow mold halves, FIG. 4b shows a plan view in the direction of the arrow indicated in FIG. 4a, FIG. 5a shows a partial section through the blow molding tool with closed blow mold halves before the expansion of the preform, FIG. 5b shows a section along the lines B-B in FIG. 5a, FIG. 5c shows a section along the lines C-C in FIG. 5a, FIG. 5d shows a view corresponding to FIG. 5c with an inserted blowing pin, FIG. 5e shows a view corresponding to FIG. 5d that illustrates the introduction of the insert into the partially formed article, FIG. 6a shows the opened blow molding tool with retracted mold spacers, FIG. 6b shows a partial longitudinal section through the blow molding tool in the state that is shown in FIG. 6a, FIG. 7a shows a cross section through the blow molding tool in the closed state and FIG. 7b shows a cross section through the blow molding tool and the article during article removal.

In FIG. 1, first of all the step of extruding an approximately tube-shaped preform according to the invention is illustrated. Firstly, a tube-shaped preform made of thermoplastic material is discharged in the molten hot state from the extruder head denoted by 1, to be precise in a known way through an annular die of the extruder head 1. The extrusion may take place continuously or discontinuously. In the exemplary embodiment represented, the preform tube 2 is separated along one side of the length by means of a separating device 3, so that it is given the cross-sectional form represented in FIG. 2 over its entire length, i.e. is provided with a longitudinal slit 4. Coming into consideration, for example, as the separating device are a hot knife, a movable blade, a laser or the like.

As in the exemplary embodiment represented, the separation of the preform tube 2 may take place outside the extruder head after and during the emergence of the preform tube 2 from the extruder head 1 or from the annular die (not shown).

Alternatively, separation of the preform tube 2 may also take place inside the extruder head 1, with a flow divider provided there.

Finally, as a further alternative, the preform tube 2 may first be discharged to its full length and then separated by means of a gripper and a separating device.

In the case of the exemplary embodiment represented, it is envisaged to take the preform tube 2 from the extruder head 1 by means of a gripper 5 and bring it to the blow molding tool 6, as schematically illustrated in FIG. 3.

The gripper 5 is represented in a greatly simplified form in the drawings. It does not necessarily have to have a circular-segmental gripper element, but rather it may have gripper segments arranged in a circular arc or a polygon, with suction cups provided for taking over the preform tube 2. As already mentioned at the beginning, such a gripper is described, for example, in DE 102 05 524. The taking off of the preform tube 2 may be supported by a further separating device for the preform tube 2. Alternatively, by constricting the die gap of the extruder head, a thin location can be produced in the preform tube 2, which makes it possible for said tube to be torn off by means of a gripper 5.

During the manipulation of the preform tube 2 with the gripper 5, the preform tube 2 can be expanded in the circumferential direction or radially, in order to achieve a corresponding overlapping of the cavities 7 of the blow molding tool 6. At its lower end, in the direction of gravitational force, the preform tube is additionally gripped and clamped in the regions adjacent the slit 4 respectively by a spreading element 22. The spreading elements 22 may be formed, for example, as pneumatically operable tongs, which may be formed such that they can be moved in relation to one another in the sense of spreading out the preform tube 2.

In the exemplary embodiment represented, a single-cavity tool is shown, i.e. the cavities 7 that complement one another of the blow mold halves 8a, 8b form a single impression. The blow molding tool 6 according to the invention may equally well be formed as a multi-cavity tool.

While the gripper 5 is bringing the preform tube between the opened blow mold halves 8a, 8b of the blow molding tool 6, at the same time an alignment of the longitudinal slit 4 of the preform tube 2 takes place in such a way that the longitudinal slit 4 is brought into line with the parting plane 10 or separating plane of the blow molding tool, to be precise in the direction of the side facing the viewer in the case of the exemplary embodiment that is represented in FIG. 3.

Each of the blow mold halves 8a, 8b of the blow molding tool 6 is provided with slides 9a, b, c, d, which are preferably formed such that they can be hydraulically extended out from the parting plane of the blow molding tool 6 and retracted into it. These slides 9a, b, c, d serve during the closing movement of the blow mold halves 8a, 8b as mold spacers and are referred to correspondingly hereafter.

As can be seen in particular from FIG. 3, the mold spacers 9a, b, c, d respectively frame the cavities 7 of the blow mold halves 8a, 8b, the arrangement that is represented in the figure not being adapted to the contour of the cavities 7 for reasons of a simplified representation. In fact, the mold spacers (slides) consist of a number of segments 9a, b, c, d, which are respectively adapted to the contour of the cavities 7, in order to keep the occurrence of flash as little as possible. The mold spacers may also be of a one-part form.

Once the preform tube has been brought into the position shown in FIG. 3 and correspondingly aligned, the blow mold halves 8a, 8b of the blow molding tool 6 with the mold spacers 9a, b, c, d extended out from the parting plane 10 are moved toward one another in such a way that the mold spacers 9a, b, c, d assume the position shown in FIGS. 5a and 5b. They clamp the preform tube 2 circumferentially between them, while forming flash 11. In this position, the blow mold halves 8a, 8b are not completely closed, but are kept at a distance from one another by means of the mold spacers 9a, b, c, d.

On one of the end faces of the blow mold halves 8a, 8b, i.e. those sides that extend transversely in relation to the parting plane 10 of the blow molding tool 6, recesses 12 that respectively complement one another are provided in the mold spacers 9a, b, c, d, and when the spacers 9a, b, c, d are moved together, as represented in FIG. 5a, respectively form openings 13, through which the parting plane 10 of the closed blow mold halves 8a, 8b extends. These openings are respectively arranged symmetrically with respect to the (imaginary) parting plane 10. The longitudinal slit 4 of the preform tube 2 likewise ideally extends in the parting plane 10 of the blow molding tool.

After the mold spacers 9a, b, c, d have been moved together, for example caused (enforced) by the closing movement of the blow mold halves 8a, 8b, the preform tube is pinched together, while forming the flash 11 only outside the opening 13. In the region of the openings 13, the longitudinal slit 4 of the preform tube 2 remains open.

In a further method step, which is illustrated in FIGS. 5b and 5c, a blowing pin 14, attached to a blow mold half 8b, is respectively inserted into the openings 13. The blowing pins 14 each have an approximately circular cross section in a way corresponding to the openings. The invention should be understood in the sense that the contour of the openings 13 as well as the number of openings 13 and the corresponding number of blowing pins 14 are not critical for the invention.

In the case of the exemplary embodiment represented, the blowing pins 14 are attached to a blow mold half 8b in a pivotably movable manner; the invention should be understood in the sense that the blowing pins 14 may also be provided on a separate device.

As revealed by FIGS. 5c and 5d in particular, the blowing pins 14 are each provided with a sealing collar 15, which seals them from the mold spacers 9a in the region of the openings 13.

In a further method step, which is illustrated in FIGS. 5d and 5e, the preform tube is placed against the cavities 7 while introducing blowing air and is formed against said cavities. After expansion and partial formation of the preform tube 2 into the semifinished article 16, the blowing pins 14 can be pivoted out from the openings 13. Said pins respectively clear the openings 13 completely, so that a manipulator 17 with an insert 18 can be inserted into the semifinished article 16, as is shown in FIG. 5e.

Once the inserts 18 have been joined onto the wall of the semifinished article 16, the openings 13 are once again closed by the blowing pins 14. Then the perforns are once again subjected to blowing pressure in order to prevent any folding of the preform tube in the region adjacent the mold spacers 9a, b, c, d or to smooth out any folds occurring there.

At this point it should be mentioned once again that the number and position and the type of inserts are not critical for the invention. In the present case, for example, the article may be a fuel tank into which a surge chamber is introduced as an insert.

In the case of the exemplary embodiment that is shown in FIG. 3, the manipulator 17, which is formed as a three-axis robot arm, and the likewise three-axis gripper 5 are arranged on respectively opposite sides of the blow molding tool 6. They may alternatively be arranged on one side of the blow molding tool 6.

Once the insert 18 has been introduced into the semifinished article 16, the blowing pins 14 have possibly been inserted into the openings 13 and the preform tube 2 has been post-molded, the mold spacers 9*a, b, c, d* are retracted (see FIG. 6*a*) and the blow mold halves 8*a, b* perform a closing movement, in which the wall material of the semifinished article extending over the width of the gap 19 between the blow mold halves 8*a, b* is pinched together to form further flash 20. For reasons of a simplified representation, the gap 19 is shown in the drawings larger than it actually is.

The finished article is given the shape shown in FIGS. 7*a* and 7*b*. The blow mold halves 8*a, b* open, or are moved apart in the direction of the arrows shown in FIG. 7*b*, and the finished article 21 can be removed by means of a removal device. It goes without saying that the flash 20 is removed.

LIST OF DESIGNATIONS

1 Extruder head
2 Preform tube
3 Separating device
4 Longitudinal slit
5 Gripper
6 Blow molding tool
7 Cavities
8*a, b* Blow mold halves
9*a, b, c, d* Slides (mold spacers)
10 Parting plane
11 Flash
12 Recesses
13 Openings
14 Blowing pins
15 Sealing collar
16 Semifinished article
17 Manipulator
18 Insert
19 Gap
20 Flash
21 Finished article
22 Spreading elements

What is claimed is:

1. A method for producing a plastic article comprising the following method steps:
   extruding an approximately tube-shaped stream of melted plastic through an extruder head to form an extrudate;
   dividing the stream of melted plastic that is inside the extruder head or separating the extrudate that is emerging, or has already emerged, from the extruder head to obtain a preform with an approximately C-shaped cross section;
   placing the preform between two halves of a blow molding tool;
   partially closing the blow molding tool and clamping the preform with slides that frame the cavity of the blow molding tool as mold spacers and form at least one opening;
   applying differential pressure to the preform to expand the preform into a hollow body within the partially closed blow molding tool;
   introducing at least one insert into the interior of the hollow body through an open side of the hollow body in the partially closed blow molding tool;
   closing the blow molding tool completely to form a pinch-off seam which at least partially surrounds the formed article.

2. The method as claimed in claim 1, characterized in that a separating seam of the hollow body is aligned with a separating plane of the blow molding tool.

3. The method as claimed in claim 1, characterized in that the preform is expanded by means of blowing air, at least one blowing pin being introduced into the opening formed by the mold spacers.

4. The method as claimed in claim 1, characterized in that the introduction of the insert takes place through the opening formed by the mold spacers.

5. The method as claimed in claim 1, characterized in that the preform is taken off from the extruder head and brought between the opened halves of the blow molding tool by means of a gripper.

6. The method as claimed in claim 1, characterized in that the perform is expanded and/or partially stretched in the circumferential direction before or during the introduction between the opened blow mold halves.

7. The method as claimed in claim 1, characterized in that the insert is introduced into the partially formed preform by a manipulator.

8. The method as claimed in claim 7, characterized in that the manipulator is a multiaxis manipulator.

9. The method as claimed in claim 1, characterized in that, after the introduction of the insert, a blowing pin is once again introduced into the opening formed by the mold spacers and the preform is once again subjected to blowing air.

* * * * *

UNITED STATES PATENT AND TRADEMARK OFFICE
CERTIFICATE OF CORRECTION

PATENT NO. : 8,951,461 B2
APPLICATION NO. : 13/380772
DATED : February 10, 2015
INVENTOR(S) : Heim et al.

It is certified that error appears in the above-identified patent and that said Letters Patent is hereby corrected as shown below:

In the Claims

In column 8, line 34, in claim 6, delete "perform" and insert -- preform --, therefor.

Signed and Sealed this
Sixteenth Day of June, 2015

Michelle K. Lee
*Director of the United States Patent and Trademark Office*